United States Patent
Clément et al.

(10) Patent No.: US 7,087,731 B2
(45) Date of Patent: Aug. 8, 2006

(54) PHTHALIMIDYL AZO DYES, PROCESS FOR THE PREPARATION THEREOF AND THE USE THEREOF

(75) Inventors: Antoine Clément, Basel (CH); Jean-Claud Wilhelm, Knoeringue (FR); Alfons Arquint, Basel (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 290 days.

(21) Appl. No.: 10/467,263

(22) PCT Filed: Jan. 29, 2002

(86) PCT No.: PCT/EP02/00904

§ 371 (c)(1),
(2), (4) Date: Aug. 4, 2003

(87) PCT Pub. No.: WO02/068539

PCT Pub. Date: Sep. 6, 2002

(65) Prior Publication Data

US 2004/0097716 A1    May 20, 2004

(30) Foreign Application Priority Data

Feb. 7, 2001    (EP) .................................. 01810127

(51) Int. Cl.
C09B 29/36    (2006.01)
C09B 29/09    (2006.01)
C09B 67/22    (2006.01)
D06P 1/18    (2006.01)

(52) U.S. Cl. .............................. 534/789; 8/466; 8/639; 8/662; 8/696; 534/597

(58) Field of Classification Search ................ 534/789; 8/466, 639, 662, 696
See application file for complete search history.

(56) References Cited

U.S. PATENT DOCUMENTS

| 3,980,634 A | 9/1976 | Weaver ....................... 260/152 |
| 5,218,095 A | 6/1993 | Trottmann .................. 534/789 |
| 6,555,664 B1 | 4/2003 | Lauk et al. ................. 534/789 |

FOREIGN PATENT DOCUMENTS

| EP | 0443984 | 8/1991 |
| WO | 00/40656 | 7/2000 |

*Primary Examiner*—Fiona T. Powers
(74) *Attorney, Agent, or Firm*—Kevin T. Mansfield; Tyler A. Stevenson

(57) ABSTRACT

The present invention relates to dyes of formula wherein $R_1$ is hydrogen, methyl or —BHCO—$C_1$–$C_4$alkyl, $R_2$ is $C_1$–$C_4$alkyl, it being possible for the alkyl chain, from $C_2$ upwards, optionally to be interrupted by an oxygen atom, and $R_3$ has, independent of $R_2$, any of the meanings of $R_2$, and to the process for the preparation thereof and to the use thereof in dyeing or printing semi-synthetic and especially synthetic hydmophobic fiber materials, especially textile materials.

14 Claims, No Drawings

PHTHALIMIDYL AZO DYES, PROCESS FOR THE PREPARATION THEREOF AND THE USE THEREOF

The present invention relates to disperse dyes having an N-butyl-phthalimide-diazo component and an aniline coupling component, to processes for the preparation of such dyes and to the use thereof in dyeing or printing semi-synthetic and especially synthetic hydrophobic fibre materials, especially textile materials.

Disperse azo dyes having an N-alkyl-phthalimide-diazo component and an aniline coupling component have been known for a long time and are used in dyeing hydrophobic fibre materials. It has, however, been found that the dyeings or prints obtained using the currently known dyes do not in all cases satisfy today's requirements, especially in respect of fastness to washing and fastness to perspiration. There is therefore a need for new dyes that especially have good washing fastness properties.

It has now been found, surprisingly, that the dyes according to the invention meet the criteria given above to a considerable degree.

The present invention accordingly relates to disperse dyes that yield dyeings having a high degree of fastness to washing and to perspiration and that, in addition, have good build-up characteristics both in the exhaust and thermosol processes and in textile printing. The dyes are also suitable for discharge printing.

The dyes according to the invention correspond to formula

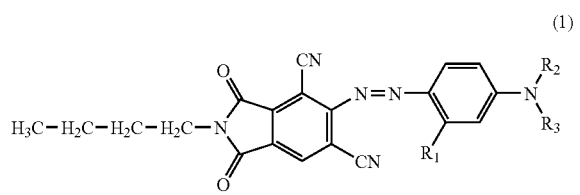

wherein $R_1$ is hydrogen, methyl or —NHCO—$C_1$–$C_4$alkyl, $R_2$ is $C_1$–$C_4$alkyl, it being possible for the alkyl chain, from $C_2$ upwards, optionally to be interrupted by an oxygen atom, and $R_3$ has, independently of $R_2$, any of the meanings of $R_2$.

$R_1$ is preferably —NHCO—$C_1$–$C_4$alkyl.

$C_1$–$C_4$alkyl in the radical —NHCO—$C_1$–$C_4$alkyl is methyl, ethyl, n-propyl, isopropyl, n-butyl, isobutyl, sec-butyl or tert-butyl, especially methyl.

$R_2$ and $R_3$ as $C_1$–$C_4$alkyl are, each independently of the other, methyl, ethyl, n-propyl, isopropyl, n-butyl, isobutyl, sec-butyl or tert-butyl.

$R_2$ and $R_3$ preferably have the same meaning.

$R_2$ and $R_3$ are especially ethyl or the radical —$CH_2CH_2$—$OCH_3$.

Special preference is given to dyes of formulae

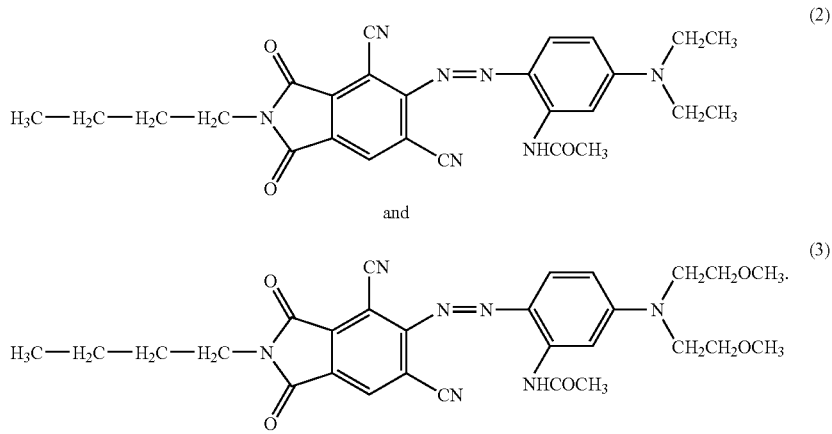

The present invention relates also to the process for the preparation of the dyes of formula (1) according to the invention.

The dyes are prepared, for example, by nitration of a phthalimide of formula

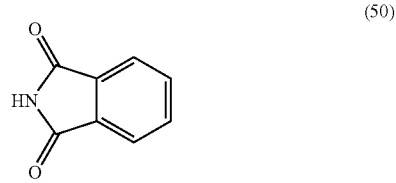

in the acid range, as described, for example, on page 459 in Organic Synthesis, Collective Volume 2, (a Revised Edition of Annual Volumes X–XIX), J. Wiley & Sons, followed by alkylation of the resulting nitro compound, for example in accordance with amethod described in Journal of Organic Chemisry 32 (1967) on page 1923, paragraph 3, and, for example after reductive treatment described on page 569 in Bull. Soc. Chim. de France 1957, conversion into an intermediate of formula

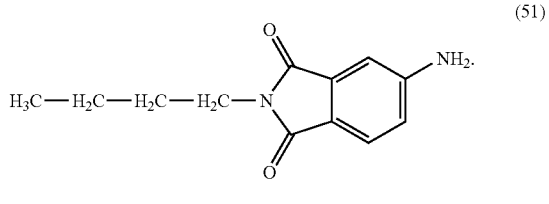

Using generally known methods, the intermediate of formula (51) is dihalogenated and is then, in an acid medium, diazotised and coupled to a compound of formula

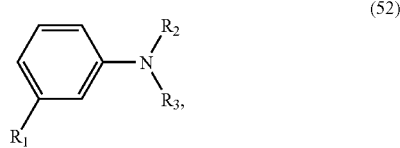

wherein $R_1$, $R_2$ and $R_3$ have the definitions and preferred meanings given above. The halogen substituents are then replaced by cyano using similarly known methods.

The halogenation is carried out, for example, by reacting the compound of formula (51) first with sodium acetateirf acetic acid and then with bromine in the same medium to form the corresponding dibromo compound.

The diazotisation of the compound of formula (51) is likewise carried out in a manner known per se, for example with sodium nitrite in an addic, for example hydrochloric-acid-containing or sulfuric-acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid, hydrochloric acid or mixtures of such acids, e.g. mixtures of propionic acid and acetic acid. The diazotisation is advantageously carried out at temperatures of from −10 to 30° C., for example from −10° C. to room temperature.

The coupling of the diazotised compound of formula (51) to the coupling component of formula (52) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The reaction to form the final dyes is carried out by replacement of the two halogen atoms by cyano groups using methods known per se, for example using CuCN or mixtures of CuCN and an alkali metal cyanide in a solvent, for example dimethylformamide, dimethyl sulfoxide, dimethylacetamide, N-vinylpyrrolidone, sulfolane or pyridine.

The diazo components of formula (51) and the coupling components of formula (52) are known or can be prepared in a manner known per se.

The present invention relates also to dye mixtures comprising at least two structurally different azo dyes of formula (1).

Preference is given to dye mixtures comprising two structurally different azo dyes of formula (1).

Special preference is given to dye mixtures comprising the azo dyes of formulae (2) and (3).

The dye mixtures according to the invention comprising at least two structurally different azo dyes of formula (1) can be prepared, for exaihple,by simply mixing the individual dyes, for example by mixing the dyes of formulae (2) and (3).

The amounts of the individual dyes in the dye mixtures according to the invention can vary within a wide range, for example from 95:5 to 5:95 parts by weight, especially from 70:30 to 30:70 parts by weight, more especially from 55:45 to 45:55 parts by weight of the individual dyes in a dye mixture comprising two azo dyes according to the invention.

Very special preference is given to dye mixtures comprising the dyes of formulae (2) and (3) in a ratio by weight of from 1.1:0.9 to 0.9:1.1, especially in a ratio by weight of 1:1.

The dyes and dye mixtures according to the invention may be used for dyeing or printing semi-synthetic and especially synthetic hydrophobic fibre materials, especially textile materials. Textile materials composed of blend fabrics that comprise such semi-synthetic or synthetic hydrophobic fibre materials can also be dyed or printed using the dyes or dye mixtures according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the dyes and dye mixtures according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½-acetate is dyed preferably at from 65 to 85° C. and cellulose triacetate at temperatures of from 65 to 115° C.

The dyes and dye mixtures according to the invention will not colour wool and cotton present at the same time in the dyebath or will colour such materials only slightly (very good reservation) so that they can also be used satisfactorily in the dyeing of polyester/wool and polyester/cellulosic fibre blend fabrics.

The dyes and dye mixtures according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes or dye mixtures according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes and dye mixtures according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the finished dyeings are further characterised by very good fastness to rubbing. Special emphasis should be given to the good fastness properties of the dyeings obtained with respect to perspiration and, especially, to washing.

The dyes and dye mixtures according to the invention can also be used satisfactorily in producing mixed shades together with other dyes.

Furthermore, the dyes and dye mixtures according to the invention are also well suited to dyeing hydrophobic fibre materials from supercritical $CO_2$.

The present invention relates to the above-mentioned use of the dyes and dye mixtures according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found above in the more detailed description of the use of the dyes according to the invention.

The invention relates also to hydrophobic fibre materials, preferably polyester textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimetres.

EXAMPLE 1

A. 26.25 g of glacial acetic acid are introduced into a laboratory reaction apparatus and, over the course of 3 minutes, 1.78 g of the compound of formula

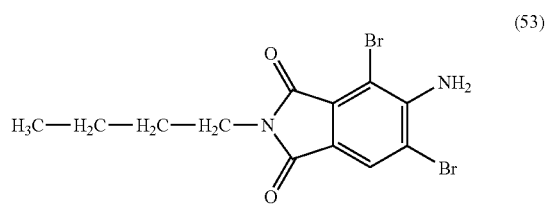

are introduced at room temperature. The resulting greenish suspension is stirred for 5 minutes and then, over the course of 7 minutes, 0.54 g of 98% sulfuric acid is added; stirring is carried out for 10 minutes. Then, over the course of 20 minutes, with cooling at 15–20° C., 1.86 g of 40% nitrosylsulfuric acid are added dropwise to the reaction mixture and stirring is carried out for 1 hour at that temperature. After the reaction is complete, the mixture is added dropwise, over the course of 10 minutes, to a mixture consisting of 6.30 g of glacial acetic acid, 0.58 g of 32% hydrochloric acid, 11.00 g of ice-water and 5.00 g of a 31.1% aqueous solution of the compound of formula

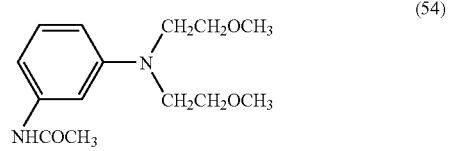

at a temperature of 0–5° C. and is stirred for 120 minutes. Then, over the course of 10 minutes, 15.00 g of ice-water are added dropwise; the resulting red suspension is filtered with suction, washed with deionised water and dried.

There are obtained 2.20 g of the compound of formula

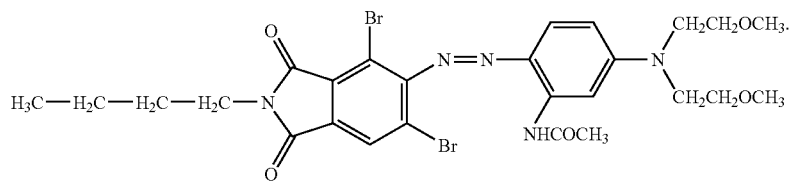

B. 1.30 g of the compound of formula (55) and 10 ml of dimethyl sulfoxide are introduced into a laboratory reaction apparatus and stirred for 10 minutes at room temperature. Then, over the course of 10 minutes, 0.10 g of sodium cyanide and 0.36 g of copper(I) cyanide are introduced and the mixture is stirred for 60 minutes. Then, over the course of 10 minutes, a further 0.10 g of sodium cyanide and 0.36 g of copper(I) cyanide are added and stirring is carried out for 10 minutes; the temperature is then increased to 50° C. over the course of 4 minutes. The reaction mixture is stirred for 5 minutes at that temperature and then cooled to room temperature; 2.00 g of water are added over the course of 10 minutes and stirring is carried out for a further 30 minutes. The suspension is then filtered with suction, and washing with warm water (50° C.) and drying are carried out.

There is obtained 0.85 g of the azo dye of formula

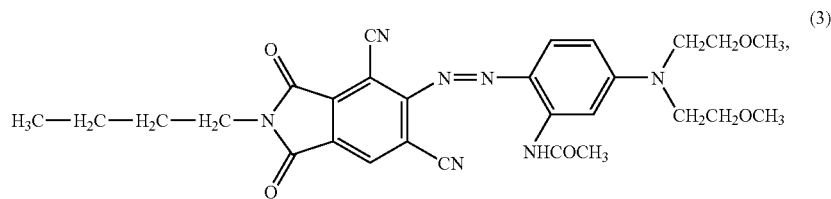

(3)

which dyes polyester a blue shade.

EXAMPLE 2

1 part by weight of the dye of formula

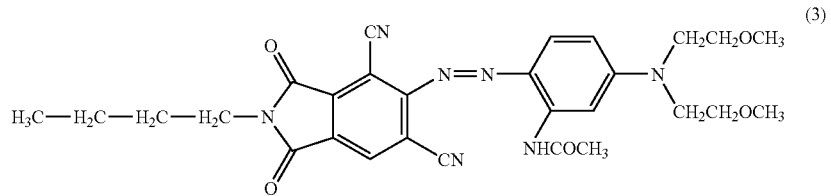

(3)

is ground in a sand mill, together with 17 parts by weight of water and 2 parts by weight of a commercially available dispersant of the dinaphthylmethanedisulfonate type, and converted into a 5% aqueous dispersion.

Using that formulation, a 1% dyeing (based on the dye and the substrate) is produced on woven polyester fabric by the high-temperature exhaust process at 130° C. and is cleaned reductively. The blue dyeing obtained in that manner has very good in-use fastness properties, especially excellent fastness to washing.

The same good fastness properties can be achieved when woven polyester fabric is dyed in the thermosol process (10 g/litre of dye, liquor pick-up 50%, fixing temperature 210° C.).

What is claimed is:

1. A dye of formula

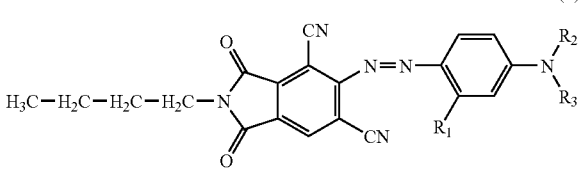

(1)

wherein $R_1$ is hydrogen, methyl or —NHCO—$C_1$–$C_4$alkyl, $R_2$ is $C_1$–$C_4$alkyl, it being possible for the alkyl chain, from $C_2$ upwards, optionally to be interrupted by an oxygen atom, and $R_3$ has, independently of $R_2$, any of the meanings of $R_2$.

2. A dye according to claim 1, wherein $R_1$ is —NHCO—$C_1$–$C_4$alkyl.

3. A dye according to claim 1, wherein $R_2$ and $R_3$ have the same meaning and are ethyl or the radical —$CH_2CH_2$—$OCH_3$.

4. Dye according to claim 1 of formula

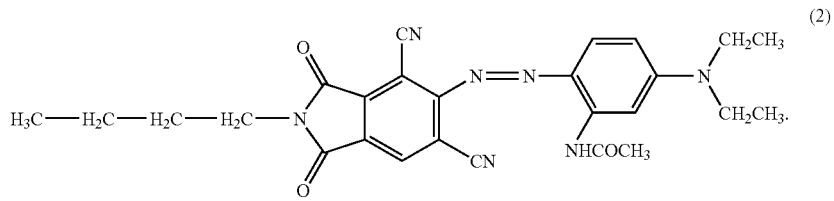

(2)

5. Dye according to claim 1 of formula

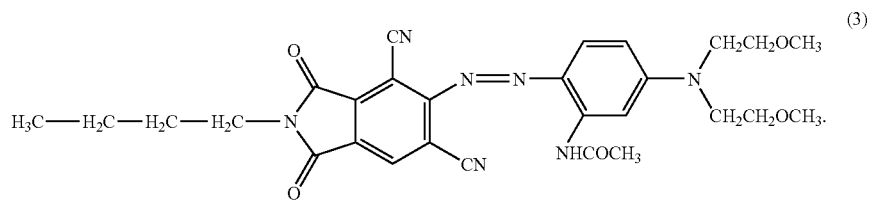

6. A process for the preparation of a dye of formula (1) according to claim 1, in which process a phthalimide of formula

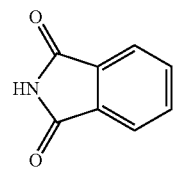

is nitrated in the acid range, the resulting nitro compound is then alkylated and, by means of reductive treatment, converted into an intermediate of formula

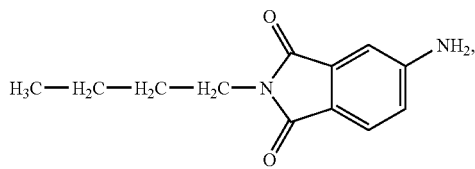

the intermediate of formula (51) is dihalogenated in an acid medium and is then diazotised and coupled to a compound of formula wherein $R_1$, $R_2$ and $R_3$ are as defined for formula (1), and the halogen substituents are then replaced by cyano.

7. A dye mixture comprising at least two structurally different dyes of formula (1) according to claim 1.

8. A process for dyeing or printing semi-synthetic or synthetic hydrophobic fibre materials comprising applying to the said materials or incorporating into said materials, a dye of formula (1) according to claim 1.

9. A semi-synthetic or synthetic hydrophobic fibre material dyed or printed by the process according to claim 8.

10. A dye according to claim 2 wherein $R_2$ and $R_3$ have the same meaning and are ethyl or the radical —$CH_2CH_2$—$OCH_3$.

11. A process for dyeing or printing semi-synthetic or synthetic hydrophobic fibre materials comprising applying to the said materials or incorporating into said materials a dye mixture according to claim 7.

12. A textile material dyed or printed by the process according to claim 8.

13. A synthetic hydrophobic fibre material dyed or printed by the process according to claim 11.

14. A textile material dyed or printed by the process according to claim 11.

* * * * *